(12) United States Patent
Hung (10) Patent No.: US 8,126,606 B2
(45) Date of Patent: Feb. 28, 2012

(54) AUTOMOBILE DETECTION AND CONTROL GATEWAY INTERFACE AND METHOD THEREOF

(75) Inventor: Ching-Huang Hung, Kaohsiung (TW)

(73) Assignee: ICM Incorporation, Kaoshiung City (TW)

( * ) Notice: Subject to any disclaimer, the term of this patent is extended or adjusted under 35 U.S.C. 154(b) by 907 days.

(21) Appl. No.: 12/132,136

(22) Filed: Jun. 3, 2008

(65) Prior Publication Data

US 2009/0240383 A1   Sep. 24, 2009

(30) Foreign Application Priority Data

Mar. 18, 2008   (TW) .............................. 97109560 A (51) Int. Cl.
*G01M 17/00* (2006.01)
(52) U.S. Cl. ......................................... 701/29
(58) Field of Classification Search .................. 701/1–2, 701/23–24, 29–36, 42, 213; 702/33–35, 702/57, 127, 188
See application file for complete search history.

(56) References Cited

U.S. PATENT DOCUMENTS

| 4,694,408 A * | 9/1987 | Zaleski ........................... 701/33 |
| 2008/0219274 A1* | 9/2008 | Kato et al. .................... 370/401 |

\* cited by examiner

*Primary Examiner* — Mary Cheung (74) *Attorney, Agent, or Firm* — WPAT., P.C.; Justin King (57) ABSTRACT

An automobile detection and control gateway interface and a method thereof are provided. The automobile detection and control gateway interface is connected with a controller area network (CAN) formed by a body control module (BCM) and body devices, and pre-stores a plurality of device diagnostic commands and status diagnostic data, so that the BCM performs corresponding actions on specific body devices according to the device diagnostic commands and capture status feedback data transmitted over the CAN by the body devices, and outputs the status diagnostic data matching with the status feedback data for determining the operation status of the body devices or for the externally connected device to acquire. All the device diagnostic commands are transferred through the BCM to avoid interfering with the operation of the CAN and control the external device connected to the BCM, so as to ensure all the body devices are under control.

3 Claims, 8 Drawing Sheets

| Function | CAN Identifier | Index Byte | Index Bit | Logic Number |
|---|---|---|---|---|
| Door Switch | 001F | 4 | 2 | 1=Unlock<br>0=Lock |
| Ignition Switch | 0001 | 2 | 1 | 1=On<br>0=Lock |

FIG. 7A

| Model | Baud Rate | Function | | CAN Identifier | Network Identifier | Index Byte | Index Bit | Output |
|---|---|---|---|---|---|---|---|---|
| 0 | 83333 | F1 | Unlock | 11 bit | 001F | 4 | 2 | P0 |
| 0 | 83333 | F2 | Lock | 11 bit | 001C | 0 | 1 | N0 |
| 0 | 83333 | F3 | Ignition Switch | 11 bit | 0001 | 2 | 1 | P1 |
| 1 | 125000 | F1 | Unlock | 29 bit | 00014240 | 4 | 0 | P0 |
| 1 | 125000 | F2 | Lock | 29 bit | 00025050 | 1 | 2 | N0 |
| 1 | 125000 | F3 | Ignition Switch | 29 bit | 00000047 | 4 | 2 | P1 |
| ... | ... | ... | ... | ... | ... | ... | ... | ... |

| Function | Network Identifier | Control Data | Execution Time |
|---|---|---|---|
| Lock | 001C | 20204848 | 0014 |
| Lock | 001C | 10104848 | 0014 |
| Lock | 001C | 00000000 | 0000 |

FIG. 8B

| Model | Baud Rate | Function | CAN Identifier | Network Identifier | Start Time | Control Data | Network Identifier | Start Time | Control Data |
|---|---|---|---|---|---|---|---|---|---|
| 0 | 83333 | F1 Lock | 11 bit | 001C | 0 | 02.55.AA | 001C | 14 | ... |
| 0 | 83333 | F2 Unlock | 11 bit | 001C | 0 | 04.AA.55 | 001C | 14 | ... |
| 1 | 125000 | F1 Lock | 29 bit | 025050 | 0 | 08.04.55.AA | 00025050 | 14 | ... |
| 1 | 125000 | F2 Unlock | 29 bit | 025050 | 0 | 08.04.AA.55 | 00025050 | 14 | ... |
| ... | ... | ... | ... | ... | ... | ... | ... | ... | ... |

AUTOMOBILE DETECTION AND CONTROL GATEWAY INTERFACE AND METHOD THEREOF

This application claims the benefit of Taiwan Patent Application No. 097109560, filed on Mar. 18, 2008, which is hereby incorporated by reference for all purposes as if fully set forth herein.

BACKGROUND OF THE INVENTION

1. Field of the Invention

The present invention relates to an automobile control device and a method thereof, and in particular, to an automobile detection and control gateway interface that controls all the body devices through the body control module by the use of the diagnostic technique and a method thereof.

2. Related Art

In the prior art, the driver always add external devices such as a revolution per minutes (RPM) gauge, a turbo boost pressure gauge, an engine temperature gauge, an alarm system, a Global Position System (GPS), a video device/audio device, or a Vehicle Data Recorder in the personal vehicle so as to assure the safety in traveling, improve the traveling performance of the vehicle, or prevent the theft of the vehicle.

However, all the performance gauges are electrically coupled to the engine bay and additional wire assembly and sensors are provided. Most of the sensors are analog or high-voltage sensors and need additional protection circuits for degaussing and regulating voltages, and so on. If any of the circuits is installed incorrectly, the engine may be destroyed, or even worse, the car may be burnt.

Additionally, when installing the alarm system, the door switch signal, the trunk lid signal, the central lock signal, and the ignition switch signal (IG-SW) etc. need to be first obtained and set or recorded in the alarm system, and the relevant circuitries need to be added in combination with the relevant circuits such as the door lock and door unlock circuit and the hazard light on circuit.

Therefore, no matter whatever the installations may be, professional and well-trained technicians are needed for carrying out the installation. The overall testing and installation process is quite complex, which increase the difficulty in installation, and is time-consuming and labor costing, resulting in the high cost and insecurity.

Further, the current automobiles are mostly equipped with a built-in controller area network (CAN) formed by a body control module (BCM) and body devices under the control of the BCM.

Figure 1:
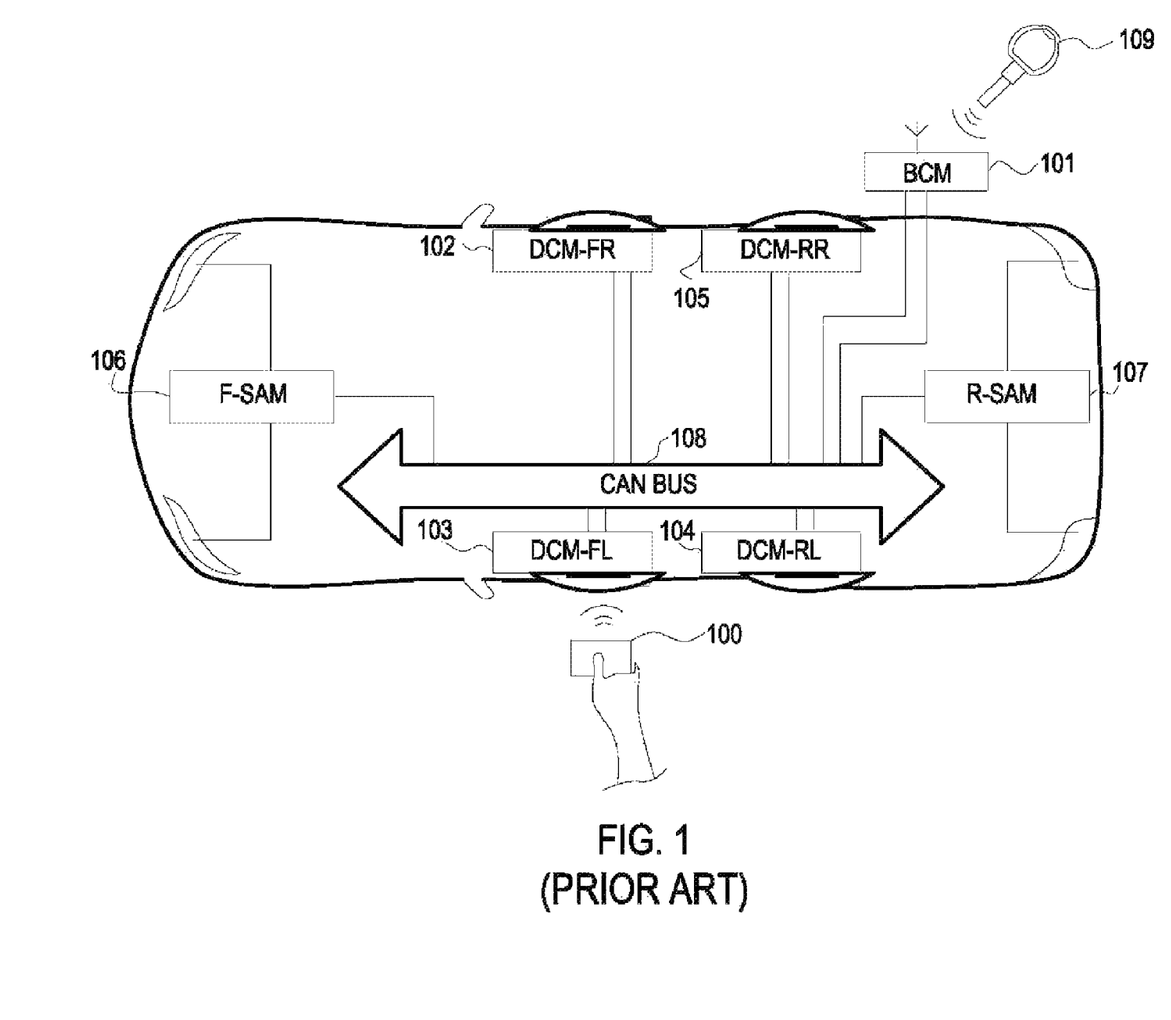
FIG. 1 illustrates a first schematic structural view of the prior art.

Referring to FIG. 1, with respect to the theft-proof measures for the vehicles, when the driver aligns the transponder key 100 with the door handle, the door control module front-left (DCM-FL) 103 reads the identification data contained in the transponder key 100 and outputs an unlock request message to the BCM 101. After determining the identification data and the door unlock request message are correct, the BCM 101 disarms the alarm system settings and sends out an unlock signal and a disarm message to a CAN bus 108.

Each of the door control modules, including the door control module front-left (DCM-FL) 103, the door control module rear-left (DCM-RL) 104, the door control module front-right (DCM-FR) 102, and the door control module rear-right (DCM-RR) 105, receives the unlock signal and unlock the car instantly. The front signal access module (F-SAM) 106 and the rear signal access module (R-SAM) 107 simultaneously receive the disarm message and then the direction indicators flash twice, which allows the driver to confirm that the alarm setting has been disarmed.

On the contrary, when the driver uses the remote lock 109 to transmit an arm command, after determining that the command and the identification data included in the arm command are correct, the BCM 101 enables the alarm system setting of the BCM 101 and outputs lock and arm signals. All the door control modules lock the door upon receiving the lock signal. The front signal access module (F-SAM) 106 and the rear signal access module (R-SAM) 107 obtain the arm setting and make the direction indicators to flash once, which allows the driver to confirm that the alarm system has been set.

However, the working principles and installation positions of the relevant body devices such as the alarm system and the GPS are written in the maintenance manuals in case of the loss of the transponder key 100 of the vehicle or for improving the convenience for genuine factory repair, which however, easily causes the crack, so the driver usually installs an additional alarm system or GPS in the vehicle in most cases. However, the genuine factory body devices are usually expensive. Therefore, manufacturers design a monitor gateway interface in connected with the CAN formed by the BCM and the built-in body devices, and the external devices that need to be installed are connected thereon in order to overcome the difficulty in installation.

Figure 2:
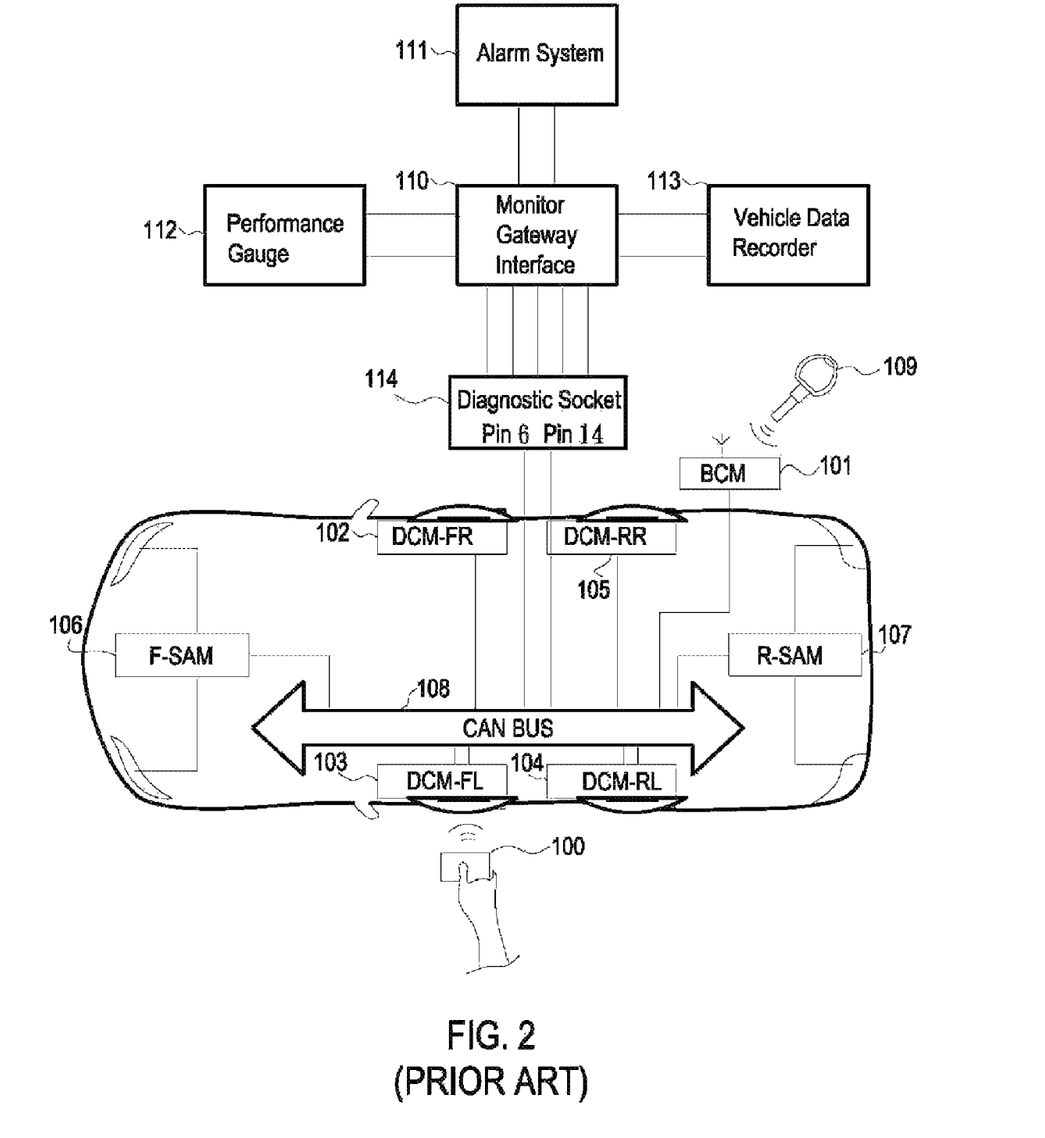
FIG. 2 illustrates a second schematic structural view of the prior art.

Referring to FIG. 2, the connection may be achieved by means of the diagnostic socket 114 of an On Board Diagnostics (OBD) conforming to the International Standard 15031-3 (ISO 15031-3) Specification, i.e. Society of Automotive Engineers (U.S.A) Standard J1962 (SAE J1962) specification. The $6^{th}$ pin (pin 6; CANHI) and $14^{th}$ in (pin 14; CAN-LOW) of the diagnostic socket 114 are pre-connected to the CAN bus 108. The monitor gateway interface 110 can get through the CAN as long as being connected with the diagnostic socket, and captures the status feedback data transferred by the body devices and the control signals sent by the BCM 101.

The monitor gateway interface 110 is additionally connected with at least one of the above external devices, such as the performance gauge 112, the Vehicle Data Recorder 113, or the alarm system 111.

With respect to the alarm system 111, the door switch signal, the trunk lid signal, the central lock signal, the ignition switch signal, or the relevant control signals need to be obtained in the set-up process. The monitor gateway interface 110 can easily obtain such signals or commands via the CAN bus 108 and establishes the relevant status determination table and control signal table which can be used for setting the alarm system 111 or other types of external devices.

However, the control signals sent by the external devices or the monitor gateway interface 110 need to have a data format identical to that of the BCM 101. Therefore, the data format of the control signals is converted through the control signal table, so as to simulate the BCM 101 to control the body devices.

However, the prior art inevitably has the following deficiencies.

1. In the normal status, the BCM and the control module of each body device have a built-in command comparison table recording the commands that can be executed by the control module of the body devices and the control data corresponding to each command. Therefore, the monitor gateway interface can only send control commands in broadcast mode to control the body devices like the BCM, and cannot control a specific body device individually.

2. When all the body devices are under the control of the BCM, the BCM continuously outputs the status of all the body devices to the CAN to ensure that the body devices match with the data recorded in the BCM. The monitor gateway interface cannot gain the control of the body devices, i.e., cannot control any body devices.

Figure 3:
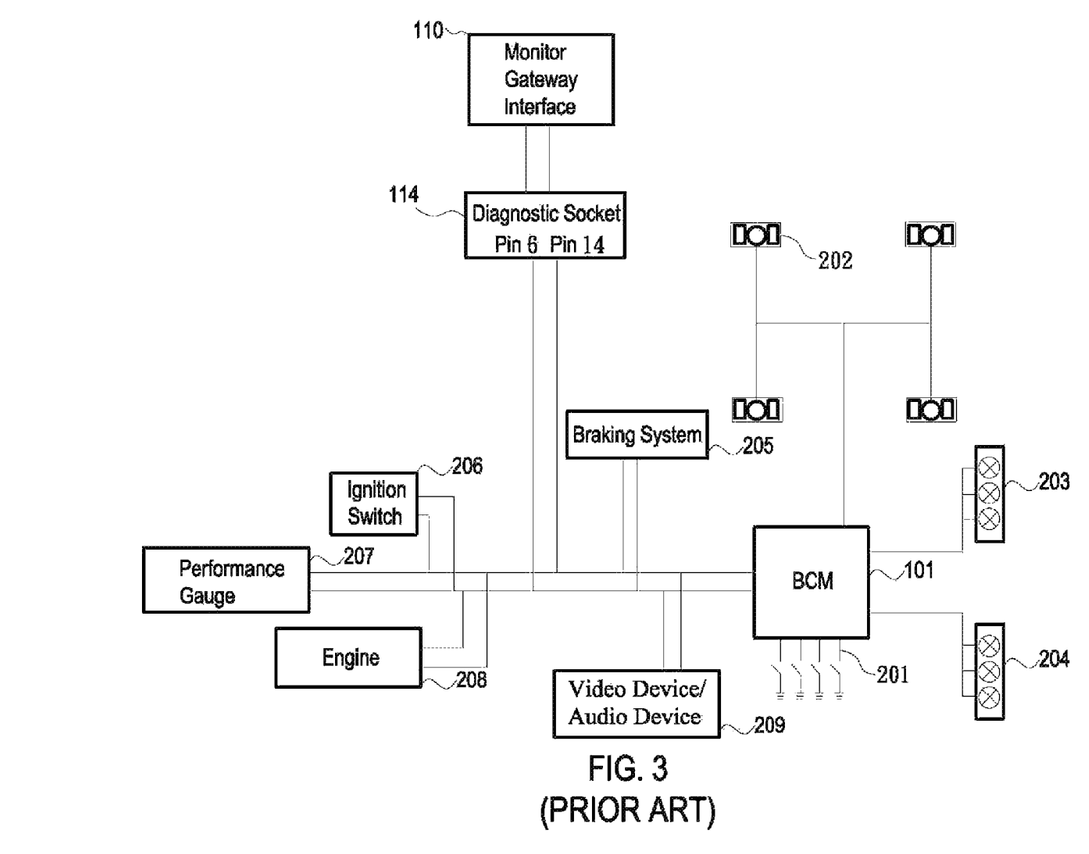
FIG. 3 illustrates a third schematic structural view of the prior art.

3. The monitor gateway interface can merely control the body devices built in the CAN. As shown in FIG. 3, the door switch 201, the central lock, the left light 203, and the right light 204 are all directly connected with the BCM 101 rather than built in the CAN formed by the BCM 101 and the automobile components, such as the ignition switch 206, the braking system 205 like the anti-lock braking system (ABS), the performance gauge 207, the engine 208, and the video device/audio device 209. Moreover, the door switch 201, the central lock, the left light 203, and the right light 204 are all controlled by the BCM 101 through electrical or analog signals. For example, the central lock sends analog signals by the use of the BCM 101 through the analog circuit simultaneously to all the door motors 202, including the front left motor, the front right motor, the rear left motor, and the rear right motor, to control all the door locks. Therefore, those body devices cannot be controlled by the monitor gateway interface 110.

SUMMARY OF THE INVENTION

In view of this, the present invention is directed to a control device which outputs device diagnostic commands through the body control module (BCM) to control all the body devices and monitors the operation status of all the body devices by the use of the diagnostic technique, and a control method thereof.

In order to achieve the above objective, the technical means of the present invention discloses an automobile detection and control gateway interface which is connected to the controller area network (CAN) formed by a BCM and a plurality of body devices. The automobile detection and control gateway interface includes an instruction database, a central processing unit (CPU), and a network controller (CAN Controller).

The instruction database provides a plurality of device diagnostic commands corresponding to the body devices. The CPU outputs a device diagnostic command for a corresponding body device in accordance with the data format recorded in the instruction database. The CAN controller is connected with the CAN based on the communication protocol of International Standard 15765-4 (ISO 15765-4) and outputs the device diagnostic command for a corresponding automobile body device over the CAN, so as to command the BCM to control the corresponding body device according to the device diagnostic command.

The device diagnostic command includes the network identifier of a body device, a control data for the body device, and an execution time of the control data. The BCM establishes a direct conversation path with the corresponding body device according to the network identifier and continuously outputs the control data to the body device in the time period specified by the execution time.

The automobile detection and control gateway interface disclosed in the present invention further includes a status database for recording a plurality of network identifiers and status diagnostic data corresponding to all the body devices. The network controller includes a transmission data register module and a received data register module. The transmission data register module first records the device diagnostic commands sent by the CPU and then sequentially outputs the device diagnostic commands so as to command the BCM to control the corresponding body device to execute corresponding actions. The received data register module first obtains all the network identifiers from the status database and then captures the data packet transmitted over the CAN to match with all the network identifiers and outputs the matching data packet to the CPU.

The automobile detection and control gateway interface disclosed in the present invention further includes a configuration module. The instruction database and the status database record a baud rate and the CAN identifier corresponding to each device diagnostic command and status diagnostic data, for the configuration module to set the CAN identifier and the baud rate of the data transmitted by the network controller and the CAN identifier used by the CPU for acquiring data packets and the outputting device control commands.

The automobile detection and control gateway interface disclosed in the present invention further includes a model switch. The instruction database and the status database record the model number corresponding to each device diagnostic command and status diagnostic data, and provide the corresponding status diagnostic data and device diagnostic command for the CPU to use according to the model number of the model switch.

The method for establishing an instruction database and a status database of the automobile detection and control gateway interface disclosed in the present invention includes the following steps. The configuration structure of the CAN is determined. A plurality of data packets transmitted over the CAN each time the body devices act is captured according to the configuration structure. The control data output by the BCM and the network identifier and the status identifier of the body devices are analyzed by the use of the data packets, and are gathered to form the status diagnostic data. Then, the status diagnostic data is integrated to form a status database. Finally, the data interdependence between the control data and the network identifier of the body device is determined, so as to establish a device diagnostic command for a corresponding body device to establish an instruction database.

In order to achieve the above objective, the present invention discloses an automobile detection and control gateway method, which is adapted to an automobile detection and control gateway interface connected to a CAN formed by a body control module and a plurality of body devices. The automobile detection and control gateway interface records a plurality of device diagnostic commands. The method includes the following steps.

A device diagnostic command is sent to the BCM by the automobile detection and control gateway interface. The device diagnostic command is analyzed by the BCM to command the corresponding body device to perform the corresponding action according to the device diagnostic command.

The automobile detection and control gateway interface further records a plurality of status diagnostic data. The automobile detection and control method further includes capturing, by the automobile detection and control gateway interface, a status feedback data output by the body device and outputting the status diagnostic data that matches with the status feedback data.

In the automobile detection and control method disclosed in the present invention, the automobile detection and control gateway interface is further connected with an external device, and the external device acquires the status diagnostic data output by the automobile detection and control gateway interface for making analysis and comparison to perform relevant actions.

The present invention provides the following effects that cannot be arrived at by the prior art.

1. The automobile detection and control gateway interface controls a single body device or some body devices corresponding to a certain function through the BCM by means of sending a device diagnostic instruction, which is not limited to the broadcast mode. Therefore, the sent device diagnostic instruction may select a specific body device to make it act individually. Therefore, the application of the device diagnostic instructions is diversified, thereby improving accuracy in device diagnosis and control.

2. Although the BCM continuously outputs the status data for each body device to the CAN, the automobile detection and control gateway interface sends the device diagnostic instructions through the BCM. Therefore, the body devices are indeed under the control of the BCM, so the problem that the automobile detection and control gateway interface cannot gain the control of the body devices cannot be eliminated.

3. Even if the body devices are directly connected to the BCM rather than built in the CAN, the automobile detection and control gateway interface can control such type of body devices by sending the device diagnostic instructions through the BCM.

4. The automobile detection and control gateway interface is connected to the CAN based on the communication protocol of International Standard 15765-4 which is a communication protocol used by the CAN in communication with external devices and will not influence the original communication protocol of data transmission of the CAN. Therefore, the applicability of the automobile detection and control gateway interface is improved.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

To further explain the objectives, construction features, and functions of the present invention, the detailed description is made below with reference to the related embodiments and accompanying drawings.

Figure 4:
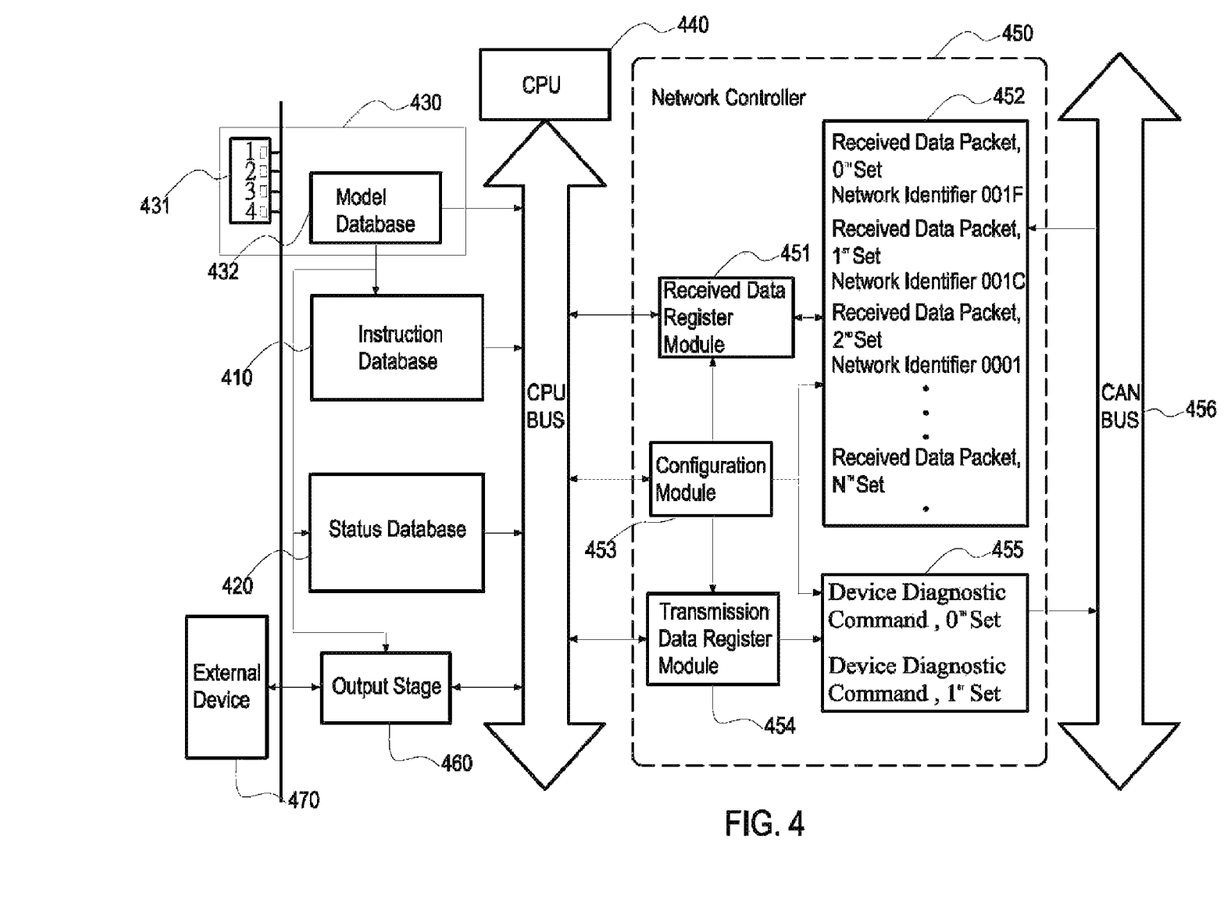
FIG. 4 illustrates a schematic structural view of a device according to an embodiment of the present invention.

FIG. 4 illustrates an automobile detection and control gateway interface according to an embodiment of the present invention. The gateway interface is connected to a controller area network (CAN) formed by a body control module (BCM) and a plurality of body devices, thereby forming an automobile detection and control gateway system. The connection manner is the same as that in the prior art, i.e., the diagnostic socket of the On Board Diagnostics (OBD) is used for connection. The diagnostic socket conforms to the International Standard 15031-3 (ISO 15031-3) specification, i.e. Society of Automotive Engineers (U.S.A) Standard J1962 (SAE J1962) specification, and the $6^{th}$ pin (pin 6; CANHI) and $14^{th}$ pin (pin14; CANLOW) of the diagnostic socket are pre-connected to the CAN bus, which will not be described herein.

The automobile detection and control gateway interface includes an instruction database 410, a status database 420, a central processing unit (CPU) 440, a network controller 450, a model switch 430, and an output stage 460. The network controller 450 is provided with a transmission data register module 454, a configuration module 453, and a received data register module 451. The output stage 460 is further connected with an external device 470.

The instruction database 410 stores a plurality of device diagnostic commands corresponding to the body devices. The device diagnostic commands are the control data used by the BCM in the diagnostic mode. Each of the device diagnostic commands contains information including the network identifier corresponding to the body device, a control data for the body devices, and an execution time of the control data. Furthermore, the baud rate, the CAN identifier, and the model number corresponding to each device diagnostic command are further recorded in the instruction database.

The status database 420 stores a plurality of network identifiers and status diagnostic data corresponding to the body devices, and the baud rate, the CAN identifier, and the model number corresponding to each status diagnostic data. The baud rate may be 33.333 Kbps (but per second), 83.333 Kbps, 100 Kbps, 125 Kbps, 250K, and 500 Kbps, and so on. The CAN identifier may be 11 bits and 29 bits. However, the baud rate and the CAN identifier are not limited to these.

The model switch 430 includes a Dual In-Line Package (DIP) switch 431 and a model database 432. The model database includes a plurality of model numbers, and a corresponding model number is provided according to the switch status of the DIP switch.

For example, the DIP switch in this embodiment is provided with four subminiature switches with the sequence numbers of 1 to 4, in which 1 indicates "on" and 0 indicates "off". Thus the range is from 0000 to 1111, i.e. 0 to 15, 16 models in total. The model database records 0000 as the $0^{th}$ model with the model number 0, 0001 as the $1^{st}$ model with the model number 1, and so forth, and 1111 as the $15^{th}$ model with the model number 15.

The model database 432 provides the corresponding model number to the instruction database 410, the status database 420, and the CPU 440 according to the switch status of the DIP switch 431. The instruction database 410 provides the relevant device diagnostic instructions to the CPU 440 and the status database 420 provides the corresponding status diagnostic data and provides its network identifier to the received data register module 451 through the CPU 440. In addition, the baud rate and the CAN identifier of the model are transmitted to the configuration module 453 through the CPU 440 for setting the received data register module 451 and the transmission data register module 454.

However, different types of DIP switches have different numbers of switch statuses, and thus the quantity of the data stored in the model database varies depending on the type of the DIP switch.

The network controller 450 is connected with the CAN bus 456 based on the communication protocol of International Standard 15765-4 (ISO 15765-4) which is used by the CAN bus 456 in communication with the external device 470 and is different from the communication protocol originally used by the CAN bus 456.

The received data register module 451 first obtains the network identifier provided by the status database and establishes an identifier comparison table 452, and then capture the CAN message data on the CAN bus 456 according to the previously set baud rate and CAN identifier. The CAN message data is the data packet broadcasted on the CAN bus 456 by the BCM and the body device and contains the control data sent by the BCM or the status feedback data fed back by the body device.

Thereafter, the received data register module 451 compares the network identifier of the data packet with the network identifier recorded in the previously established identifier comparison table 452. After acquiring the data packet for the matching network identifier, it is transmitted to the CPU 440 mainly used for capturing the status feedback data fed back by the body device.

The CPU 440, with reference to the model number and the network identifier of the data packet provided by the model switch 430, obtains the status diagnostic data corresponding to the module number and the network identifier from the status database 420 to match with the status feedback data and interpret the executed action according to data as the function, the index byte, and the index bit recorded in the status diagnostic data and the output signal in use.

Thereafter, the CPU 440 outputs the corresponding status diagnostic data to the external device 470 through the output stage 460 for the external device 470 to generate corresponding actions to be executed according to the status diagnostic data.

In addition, when the CPU 440 intends to control a specific body device, the CPU 440 obtains the same model number and the data format of all the device diagnostic commands from the instruction database according to the current model number, and generates the device diagnostic command for the body device according to the data format and then transfers it to the transmission data register module 454. The device diagnostic command contains the network identifier of the body device to be controlled, the control data for the body device, and the execution time of the control data.

The transmission data register module 454 records all the device diagnostic commands to be transmitted to form an instruction output table 455 and sequentially outputs the device diagnostic commands recorded in the instruction output table 455 over the CAN. The BCM controls the corresponding body device according to the device diagnostic command.

Figure 7A:
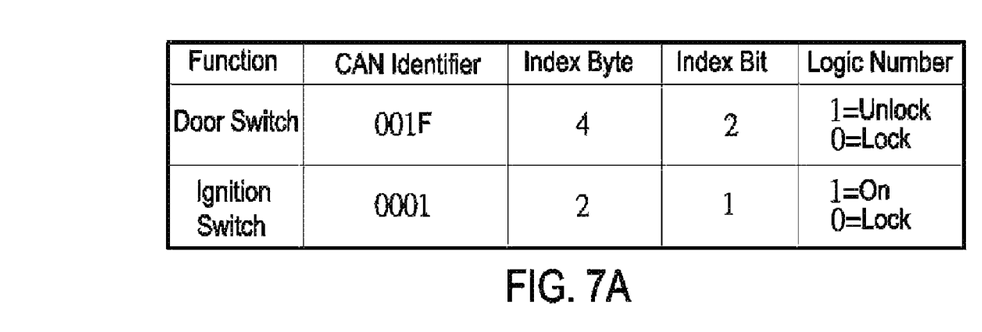
FIG. 7A illustrates a data parsing table for a controller area network of the present invention.
Figure 7B:
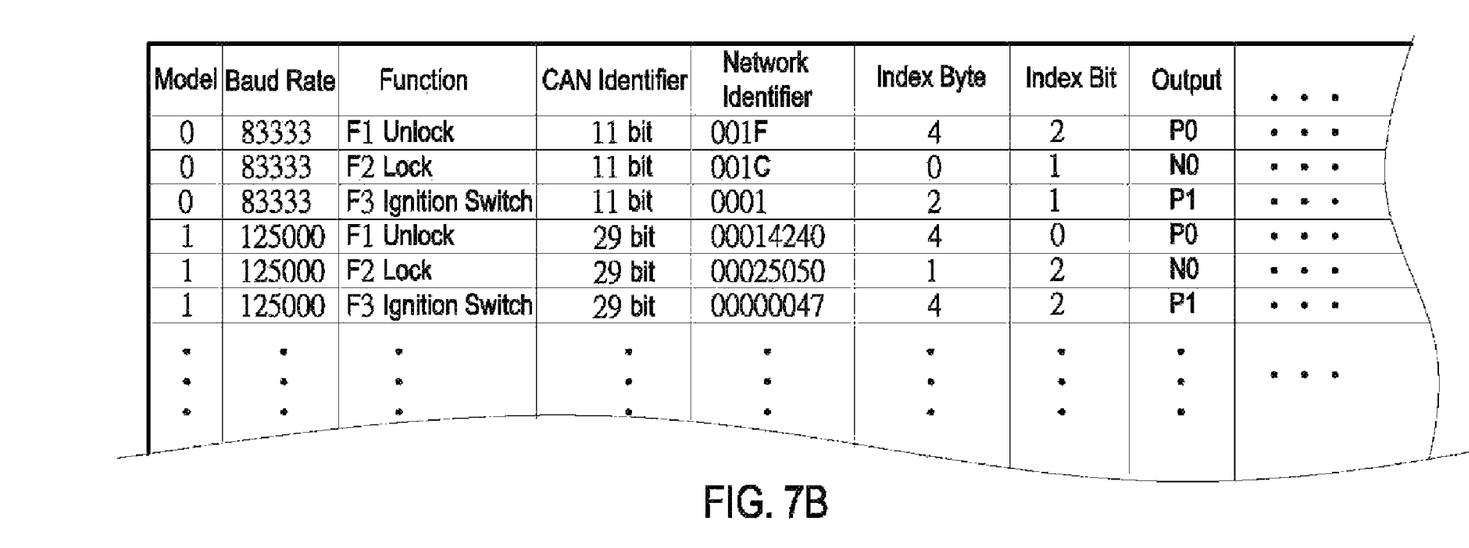
FIG. 7B illustrates a schematic diagram of data storage of a status database according to an embodiment of the present invention.
Figure 8A:
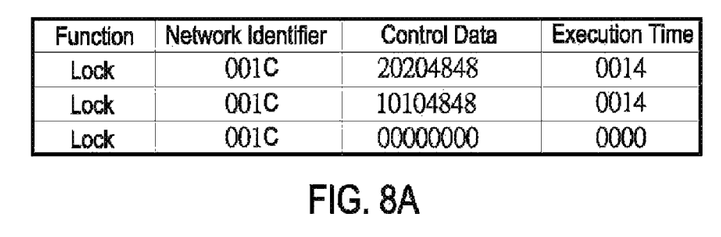
FIG. 8A illustrates a command parsing table of a controller area network according to the present invention.
Figure 8B:
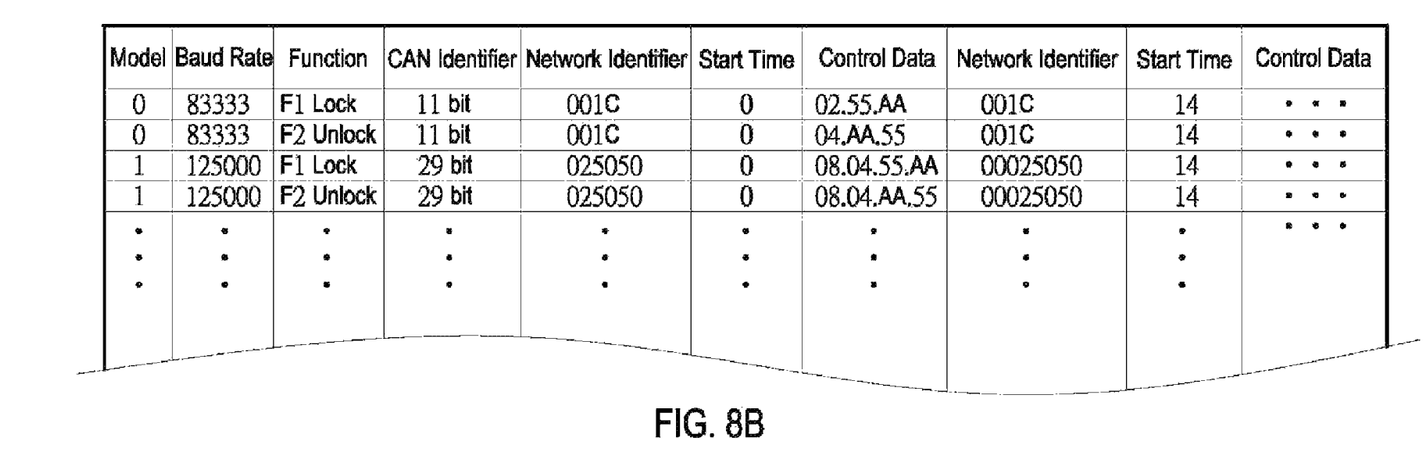
FIG. 8B illustrates a schematic diagram of data storage of an instruction database according to an embodiment of the present invention.

Referring to FIGS. 4, 7B, and 8B, the practical use is described below. The model number provided by the model database is assumed to be 0, and the instruction database 410 and the status database 420 provide the device diagnostic command and the status diagnostic data with the model number of 0. The CPU 440 determines that in the $0^{th}$ model, the baud rate of the device diagnostic command and the status diagnostic data is 83.333 K and the CAN identifier is 11 bits and provides the baud rate and the CAN identifier to the configuration module 453. The configuration module 453 sets the baud rate of the transmission data register module 454 and the received data register module 451 to 83.333 K and the CAN identifier to 11 bits. Thereafter, the CPU 440 temporarily stores all the network identifiers corresponding to all the body devices in the $0^{th}$ model in the transmission data register module 454 and send a command to establish an identifier comparison table 452.

Figure 6:
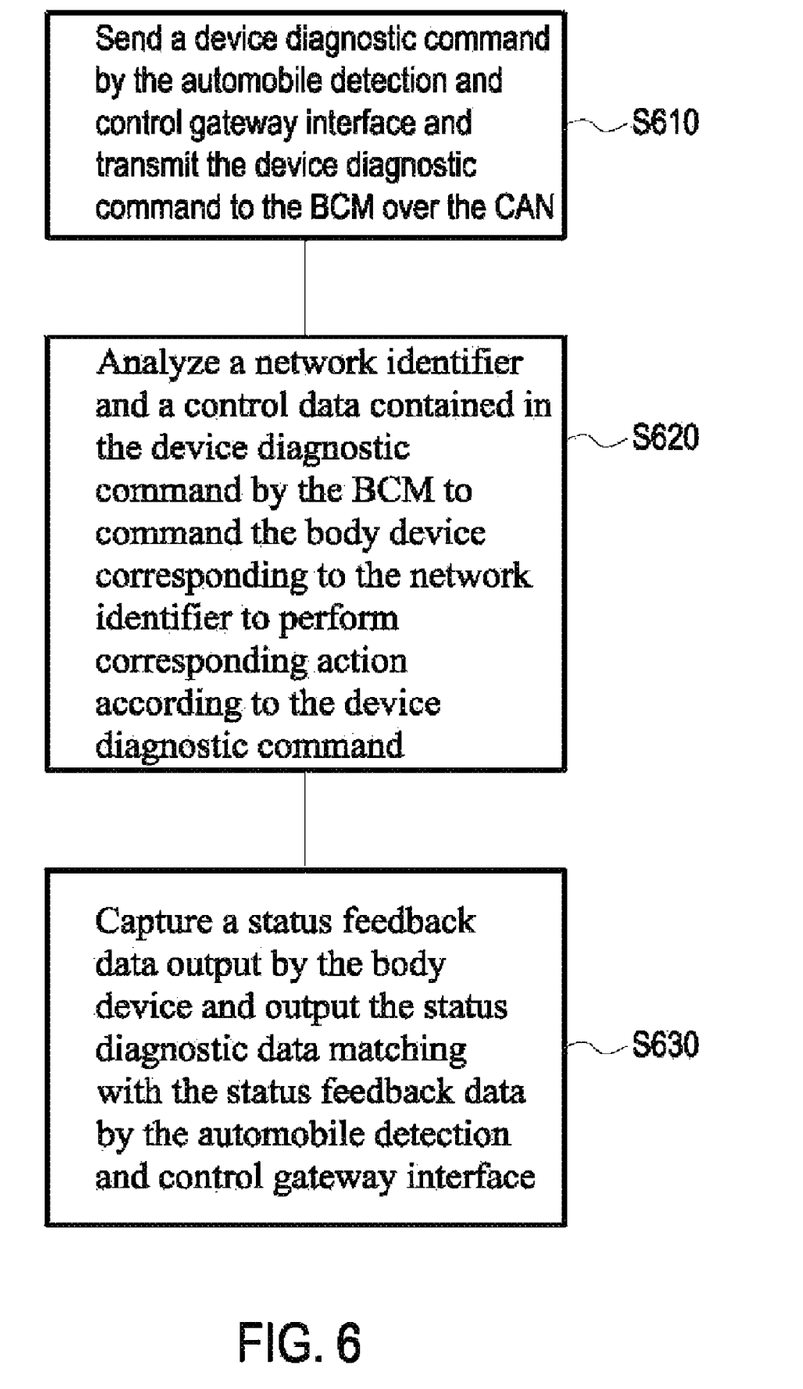
FIG. 6 illustrates a flow diagram of a detection and control method according to an embodiment of the present invention.

As shown in FIG. 6, the detection and control method can be achieved by the instruction database, the CPU, and the network controller only from the viewpoint of the user, and the control method is described as follows.

A device diagnostic command is sent by the automobile detection and control gateway interface, and the device diagnostic command is transmitted to the BCM over the CAN (step S610).

The control data sent by the CPU 440 may be requested by the external device 470 which may be a test apparatus, an alarm system, or a sensor, or the like. The CPU 440 is informed of the control data through the output stage 460. Or, the CPU 440 may spontaneously output the control data. For example, the sent control data is "lock." At this time, the CPU obtains a device diagnostic command with the function of "F1 Lock" in $0^{th}$ model for the BCM according to the instruction database as shown in FIG. 8B.

Then, a network identifier and a control data contained in the device diagnostic command are analyzed by the BCM to command the body device corresponding to the network identifier to perform corresponding action according to the device diagnostic command (step S620).

It can be known from FIG. 8B that the device diagnostic command with the function of "F1 Lock" contains a first control command with the network identifier "001C," the start time 0, and the control data "02,55,AA," and a second control command with the network identifier "001C," the start time 14, and the control data "00,00,00." It is assumed that the body device corresponding to 001C is a direction indicator, and the BCM sends the device control command at the $0^{th}$ second and stops outputting the device control command at the $14^{th}$ millisecond, then the direction indicator turns on at the $0^{th}$ second and turns off at the $14^{th}$ millisecond. A single instruction or a series of instructions may be generated in the same way.

The data may be captured by the instruction database 410, the CPU 440, and the transmission data register module of the network controller 450. The method is described as follows.

The automobile detection and control gateway interface captures a status feedback data output by the body device and outputs the status diagnostic data matching with the status feedback data (step S630).

For example, when the received data register module 451 obtains a data packet with the network identifier 001F, it transmits the data packet to the CPU 440. The CPU 440 obtains a status diagnostic data with the network identifier 001F in the $0^{th}$ model from the status database to interpret the status feedback data contained in the data packet. It can be known from FIG. 7B that the function of the network identifier 001F is "unlock (F1 Door Open)," the index byte is the fourth byte, the index bit is the second bit, and the signal in use is P0, which indicates that the $0^{th}$ channel performs the positive trigger action. Finally, the CPU 440 outputs the matching status diagnostic data from the output stage 460 to the external device 470.

If the external device 470 is a test apparatus, it determines whether the body device is functioning normally based on the obtained status diagnostic data. If the external device is an alarm system, it determines whether to emit an alarm signal based on whether it is currently alarming (ARM) or disarming (DiSARM) and then the obtained status diagnostic data, i.e. "unlock (F1 Door Open)."

In the above, the automobile detection and control gateway interface is provided for any external device, such as an alarm system, a vehicle data recorder, and a performance gauge to set or command the external device to perform relevant actions using the techniques of data monitoring and capturing. With respect to the requests from the external device, commands in a uniform format are sent by the automobile detection and control gateway interface to control the body devices without interfering with the control model used by the CAN. Furthermore, such a detection and control principle is applicable to automobile diagnostic operations. The data packets are captured to test the responses of the body devices. Device diagnostic commands are sent to actuate a single body device, some body devices, or body devices of the same function. In this way, the diagnosis of the body devices is improved and the application range for the device is thereby expanded.

Figure 5:
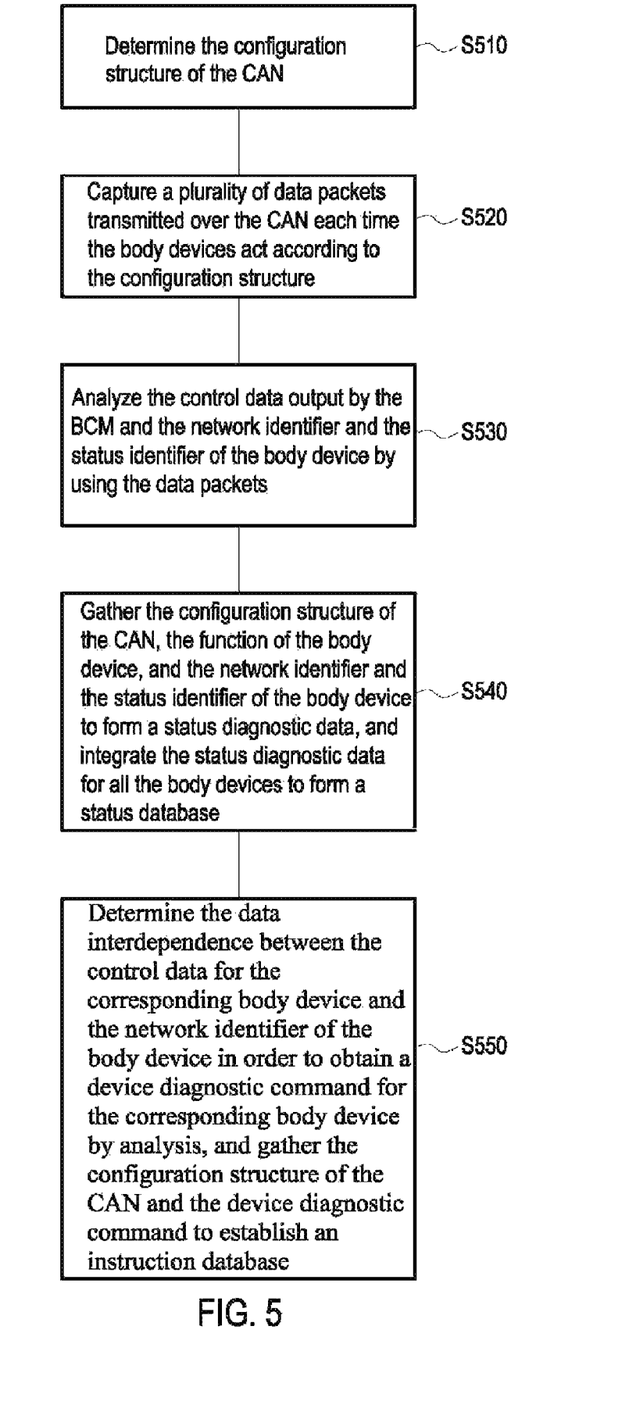
FIG. 5 illustrates a flow diagram for establishing a detection and control database according to an embodiment of the present invention.

Referring to FIG. 5, the method for establishing the automobile detection and control database according to an embodiment of the present invention is illustrated. The method mainly includes parsing the data packets transmitted over the CAN formed by the BCM and a plurality of body devices and establishing the instruction database and the status database used by the automobile detection and control gateway interface as shown in FIG. 4. Throughout the process, the databases are established in the manner of diagnosis.

First, the configuration structure of the CAN is determined (step S510) in consideration the following two aspects.

1. The physical layer of the CAN is analyzed to determine whether it is a single wire CAN or a two wire CAN. The circuit design needs to be first determined since the communication protocol, transfer manner for data packet, and transfer speed differ according to different circuit designs.

2. The data connection layer of the CAN is analyzed. The data connection layer uses the protocol of international standard 11898-1 (ISO 11898-1) specification for transmitting data packets. The analysis is made based on the conditions including the baud rate for data packet transmission and the CAN identifier of the data packets, so as to capture the correct data packets. The baud rate may be 33.333 Kbps, 83.333 Kbps, 100 Kbps, 125 Kbps, 250 Kbps, and 500 Kbps, and so on. The CAN identifier may be 11 bits and 29 bits. However, the baud rate and the CAN identifier are not limited to these.

Then, a plurality of data packets transmitted over the CAN each time the body devices act is captured according to the configuration structure (step S520).

For example, when the door switch is unlocked, the data packets transmitted over the CAN bus 456 are captured. The data packets may contain the control data sent by the BCM and the status feedback data fed back by the door control module of the corresponding door switch. The capturing is done in a way of capturing data packets at a transfer rate of 83.333 Kbps and the CAN identifier for each data packet is 11 bits.

The control data output by the BCM and the network identifier and the status identifier of the body device are analyzed using the data packets (step S530).

The door switch is described by an example. When the door switch is in on status or off status, the data packets fed back are different. Precisely, the network identifier of the body device contained in the data packets is the same, but the status feedback data are different. The feedback data of two different statuses may be used to analyze the changed index byte, the actually changed index bit in the index byte, and the meaning indicated by the status identifier.

As shown in FIG. 7A, the function is "door switch," with the corresponding network identifier (CAN ID) of "001F." The status feedback data needs to check the second bit in the fourth byte. The Logic number 1 indicates that the door switch is unlocked and the Logic number 0 indicates that the door switch is locked. The analysis for all the body devices may be made in the same way.

The configuration structure of the CAN, the function of the body device, and the network identifier and the status identifier of the body device are gathered to form a status diagnostic data, and the status diagnostic data for all the body devices are integrated to form a status database (step S540).

The configuration structure refers to that the baud rate, CAN identifier, function of the body device, network identifier and status identifier of the body device, i.e. the status data collected and organized as shown in FIG. 7A, which are respectively integrated to form the status diagnostic data corresponding to each body device, i.e., the interpretation rule for each status feedback data. All the status diagnostic data are integrated to form the status database shown in FIG. 7B.

The data interdependence between the control data for the corresponding body device and the network identifier of the body device is determined in order to obtain a device diagnostic command for the corresponding body device by analysis, and the configuration structure of the CAN and the device diagnostic command are gathered to establish an instruction database (step S550).

As shown in the table of FIG. 8A, the door lock is described by an example. When the BCM sends a lock command, it sends three packet data with the network identifier of "001C." The control data are "20204848," "10104848," and "00000000" respectively, and the time lengths are "0014," "0014," and "00000000" respectively. Thereafter, the actuated body devices are the door lock and the direction indicators, which stop operating in 20 milliseconds. Thus, it can be known that the BCM continuously sends the control data for locking and turning on the direction indicator within 20 milliseconds and sending the control data for stopping the action after 20 milliseconds to cease the continual actuation of the direction indicators and the door lock.

The data interdependence between the control data, the network identifier, and the status feedback data for the body devices may be determined with reference to the status feedback data fed back by the body device or by designing the device diagnostic commands by the use of the status database, thereby establishing a device diagnostic command for the corresponding body device. Then, the configuration structure of the CAN and all the device diagnostic commands are integrated and stored to form the instruction database 410 as shown in FIG. 7B.

However, the device diagnostic command and the status diagnostic data established are data interdependent, so the instruction database 410 and the status database 420 may be derived from each other. Also, when the instruction database 410 and the status database 420 intend to record the data of the CANs of cars of various different models, a new field of "Model" may be added in both the instruction database and the status database to record the model number corresponding to each device diagnostic command and status diagnostic data, thereby distinguishing vehicle models to which the data is applicable through the corresponding model number. If the model number is 0, the data is applicable to the model Benz-S320, and if the model number is 1, the data is applicable to the model Toyota-RAV-4, and so forth.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automobile detection and control gateway system, comprising:
   a controller area network, comprised of a body control module and a plurality of body devices, wherein the body control module actuates the corresponding body device according to a device diagnostic command, and the actuated body device outputs a status feedback data; and
   an automobile detection and control gateway interface, connected with the controller area network based on a communication protocol of International Standard 15765-4 (ISO 15765-4) and recording a plurality of status diagnostic data corresponding to the body devices, the automobile detection and control gateway interface serving for outputting the device diagnostic command, so as to command the body control module to control the corresponding body device according to the device diagnostic command, and outputting the status diagnostic data matching with the status feedback data, wherein the device diagnostic command includes the network identifier of a body device, a control data for the body device, and an execution time of the control data, the body control module establishes a direct conversation path with the corresponding body device according to the network identifier and continuously outputs the control data to the body device in the time period specified by the execution time.

2. The automobile detection and control gateway system according to claim 1, further comprising at least one external device connected with the automobile detection and control gateway interface, wherein the external device performs corresponding actions according to the status diagnostic data.

3. The automobile detection and control gateway system according to claim 1, wherein the body control module is further connected with an external device, and the body control module controls an action of the external device according to the device diagnostic command.

* * * * *